United States Patent
Miles

(10) Patent No.: US 11,149,736 B2
(45) Date of Patent: Oct. 19, 2021

(54) TURBO PUMP VENT ASSEMBLY AND METHOD

(71) Applicant: Edwards Limited, Burgess Hill (GB)

(72) Inventor: Christopher Miles, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 134 days.

(21) Appl. No.: 16/325,623

(22) PCT Filed: Aug. 3, 2017

(86) PCT No.: PCT/GB2017/052254
§ 371 (c)(1),
(2) Date: Feb. 14, 2019

(87) PCT Pub. No.: WO2018/033697
PCT Pub. Date: Feb. 22, 2018

(65) Prior Publication Data
US 2019/0186494 A1    Jun. 20, 2019

(30) Foreign Application Priority Data

Aug. 15, 2016 (GB) ....................... 1613928

(51) Int. Cl.
*F04D 9/00* (2006.01)
*F16K 15/18* (2006.01)
(Continued)

(52) U.S. Cl.
CPC ........... *F04D 9/006* (2013.01); *F04D 19/002* (2013.01); *F04D 19/042* (2013.01);
(Continued)

(58) Field of Classification Search
CPC . F04D 9/00; F04D 9/006; F04D 19/00; F04D 19/002; F04D 19/04; F04D 19/042;
(Continued)

(56) References Cited

U.S. PATENT DOCUMENTS 828,374 A * 8/1906 Blein ................ F16K 39/024
137/630.15
3,537,474 A * 11/1970 Rohrer ................ F16K 11/02
137/565.23
(Continued)

FOREIGN PATENT DOCUMENTS

DE   19835273 A1   3/1999
EP   0796805 A1    9/1997
(Continued)

OTHER PUBLICATIONS

British Search Report dated Jan. 11, 2017 and Examination Report dated Jan. 12, 2017 for corresponding British Application No. GB1613928.9.

(Continued)

*Primary Examiner* — Igor Kershteyn
*Assistant Examiner* — Joshua R Beebe
(74) *Attorney, Agent, or Firm* — Theodore M. Magee; Westman, Champlin & Koehler, P.A.

(57) ABSTRACT

A turbo pump vent assembly and method are disclosed. The turbo pump vent assembly comprises: a primary manual actuator operable to deliver an initial volume of air to a turbo pump; and a secondary manual actuator operable to deliver a secondary volume of air to the turbo pump, wherein the secondary volume of air is greater than the initial volume of air. In this way, an uncomplex and reliable vent is provided which can deliver initial volumes of air to slow the turbo pump initially. Thereafter, the secondary volume of air may be delivered to slow the turbo pump more rapidly than is possible just using further initial volumes of air. Having an apparatus which can deliver differing volumes of air enables the turbo pump to be slowed safely and more quickly than is possible by delivering just the same sized volumes of air.

15 Claims, 3 Drawing Sheets

(51) Int. Cl.
*F16K 24/06* (2006.01)
*F04D 27/02* (2006.01)
*F04D 19/04* (2006.01)
*F04D 19/00* (2006.01)

(52) U.S. Cl.
CPC ..... *F04D 27/0261* (2013.01); *F04D 27/0292* (2013.01); *F16K 15/18* (2013.01); *F16K 24/06* (2013.01); *F05B 2260/64* (2013.01)

(58) Field of Classification Search
CPC .. F04D 27/0261; F04D 27/0292; F16K 15/18; F16K 24/06; F05B 2260/64; F15B 13/00
See application file for complete search history.

(56) References Cited

U.S. PATENT DOCUMENTS

| | | | |
|---|---|---|---|
| 4,588,361 A | | 5/1986 | Saulgeot |
| 5,112,203 A | * | 5/1992 | Neward ............... A61F 5/41 251/245 |
| 5,388,612 A | * | 2/1995 | Cerola ............. A61M 13/003 137/596.2 |
| 5,443,368 A | | 8/1995 | Weeks et al. |

FOREIGN PATENT DOCUMENTS

| | | |
|---|---|---|
| EP | 2466145 A2 | 6/2012 |
| EP | 2960520 A1 | 12/2015 |
| FR | 2992927 A1 | 1/2014 |
| JP | H09158847 A | 6/1997 |
| JP | H11101357 A | 4/1999 |
| JP | 2000291586 A | 10/2000 |
| JP | 2010038137 A | 2/2010 |
| JP | 2012057630 A | 3/2012 |
| JP | 2016008612 A | 1/2016 |
| WO | 03056184 A1 | 7/2003 |

OTHER PUBLICATIONS

PCT Notification of Transmittal of the International Search Report and the Written Opinion of the International Searching Authority, or the Declaration dated Oct. 18, 2017, PCT Search Report and Written Opinion dated Oct. 18, 2017 for corresponding PCT Application No. PCT/GB2017/052254.

Japanese Notification of Reason for Rejection dated Jun. 24, 2021 for corresponding Japanese application Serial No. JP2019-50888, 3 pages.

* cited by examiner US 11,149,736 B2

TURBO PUMP VENT ASSEMBLY AND METHOD

CROSS-REFERENCE OF RELATED APPLICATION

This application is a Section 371 National Stage Application of International Application No. PCT/GB2017/052254, filed Aug. 3, 2017, and published as WO 2018/033697 A1 on Feb. 22, 2018, the content of which is hereby incorporated by reference in its entirety and which claims priority of British Application No. 1613928.9, filed Aug. 15, 2016.

FIELD

The present invention relates to a turbo pump vent assembly and method.

BACKGROUND

In a process such as dry etching, chemical vapour deposition (CVD), or the like performed in a high-vacuum process chamber in semiconductor manufacturing step, a vacuum pump such as a turbo-molecular pump is used for producing a high vacuum in the process chamber by exhausting gas from the process chamber, as shown in, for example. Japanese Unexamined Patent Application Publication No. 2000-291586.

The discussion above is merely provided for general background information and is not intended to be used as an aid in determining the scope of the claimed subject matter. The claimed subject matter is not limited to implementations that solve any or all disadvantages noted in the background.

SUMMARY

According to a first aspect, there is provided a turbo pump vent assembly, comprising: a primary manual actuator operable to deliver an initial volume of air to a turbo pump; and a secondary manual actuator operable to deliver a secondary volume of air to the turbo pump, wherein the secondary volume of air is greater than the initial volume of air. The first aspect recognises that a limiting factor in the use of a turbo pump is the time taken for a vacuum to be made and broken. One of the limiting factors to breaking a vacuum created by a turbo pump is the time taken to slow the rotor of the turbo pump. Although arrangements exist to slow the rotor by breaking, these arrangements are complex and can be unreliable or otherwise problematic. A less-complex approach involves venting the turbo pump by introducing air into the vacuum-side of the pump from the ambient-side of the pump. However, the first aspect also recognises that harsh venting using a conventional manual vent valve can cause high stresses and wear in the main bearing or bearing cage and lead to rotor instability in both conventional fixed-bearing and magnetically-levitated turbo pumps. Such venting can reduce the operational life of the turbo pump or, in more severe cases, can cause the turbo pump to seize due to the life of the emergency bearing expiring or rotor/stator components clashing.

Accordingly, a vent for a turbo pump may be provided. The vent may comprise a primary, first or initial actuator. That actuator may be manually or user activated or operated. The actuator may deliver or provide a primary, first or initial volume, amount or quantity of air or other gas to a turbo pump. The vent may also comprise a secondary or further actuator. The secondary actuator may be manually or user activated or operated to deliver or provide a second or further volume or amount of air or other gas to the turbo pump. The second volume of air may be greater or more than the amount of the initial volume of air. In this way, an uncomplex and reliable vent is provided which can deliver initial volumes of air to slow the turbo pump initially. Thereafter, the secondary volume of air may be delivered to slow the turbo pump more rapidly than is possible just using further initial volumes of air. Having an apparatus which can deliver differing volumes of air enables the turbo pump to be slowed safely and more quickly than is possible by delivering just the same sized volumes of air.

In one embodiment, the initial volume of air is less than the secondary volume of air. Accordingly, the initial volume of air may be smaller, or not as large, as the secondary volume of air.

In one embodiment, the primary manual actuator has a vent position where the initial volume of air is delivered to the turbo pump and a decoupled position where the initial volume of air is prevented from being delivered to the turbo pump. Accordingly, the primary actuator may have a vent or open position where the initial volume of air is delivered or provided to the turbo pump. The primary actuator may have a decoupled or closed position where the initial volume of air is prevented or blocked from being delivered to the turbo pump. Hence, individual bursts of initial volumes of air may be delivered to the turbo pump.

In one embodiment, the primary manual actuator is manually configurable between the vent position and the decoupled position. Accordingly, the actuator may be user-operated between the vent position and the decoupled position.

In one embodiment, the primary manual actuator is biased towards the decoupled position. Accordingly, the actuator may be predisposed to the decoupled position.

In one embodiment, the primary manual actuator is releaseably-configurable to the vent position. Accordingly, the actuator may be user operable to the vent position but then, on release, may return to the decoupled position.

In one embodiment, the primary manual actuator has a valve arrangement operable to fluidly couple a source of the initial volume of air with the turbo pump when in the vent position and to fluidly decouple the source of the initial volume of air with the turbo pump when in the decoupled position. Accordingly, a valve may be provided which, when in the vent position, may fluidly couple the source of the initial volume of air with the turbo pump and which, when in the decoupled position, may decouple the source of the initial volume of air with the turbo pump.

In one embodiment, the valve arrangement is manually operable to fluidly couple a source of the initial volume of air with the turbo pump when in the vent position and biased to fluidly decouple the source of the initial volume of air with the turbo pump when in the decoupled position.

In one embodiment, the primary manual actuator has a conduit fluidly coupling the source of the initial volume of air with the turbo pump, the conduit having a restrictor configured to restrict flow through the conduit when in the vent position. Accordingly, the flow of the initial volume of air may be restricted by a restrictor when being delivered to the turbo pump.

In one embodiment, the source of the initial volume of air comprises a reservoir operable to retain a stored volume of air when in the decoupled position and to deliver the stored volume of air as the first volume of air to the turbo pump when in the vent position. Accordingly, a reservoir may be provided which provides the initial volume of air which is contained as a stored or fixed volume of air. The stored volume of air may be retained when in the decoupled position and delivered to the turbo pump when in the vent position.

In one embodiment, the primary manual actuator comprises a valve arrangement operable to fluidly couple the reservoir with an external source of the air to fill the reservoir when in the decoupled position. Accordingly, the valve may couple the reservoir with the external source of air to fill or replenish the reservoir when in the decoupled position.

In one embodiment, the valve arrangement is operable to fluidly decouple the reservoir from the turbo pump when in the decoupled position. Accordingly, the valve may decouple or fluidly separate the reservoir and turbo pump when in the decoupled position.

In one embodiment, the valve arrangement is operable to fluidly couple the reservoir with the turbo pump to deliver the stored volume of air as the first volume of air to the turbo pump when in the vent position. Accordingly, the valve arrangement may couple or fluidly connect the reservoir and turbo pump when in the vent position.

In one embodiment, the valve arrangement is operable to fluidly decouple the reservoir from the external source of the air when in the vent position.

In one embodiment, the reservoir is displaceable between the decoupled position and the vent position. Accordingly, the reservoir may be moved, translated or displaced between the decoupled and vent positions. Movement of the reservoir may cause it to be filled and discharged.

In one embodiment, the reservoir is displaceable one of linearly and rotationally.

In one embodiment, the primary manual actuator has a plurality of the reservoirs. Accordingly, more than one reservoir may be provided in order to facilitate the delivery of individual, multiple, initial volumes of air.

In one embodiment, each reservoir is operable solely to deliver the first volume of air to the turbo pump when in an associated vent position. Accordingly, only one reservoir may deliver a volume of air to the turbo pump at a time.

In one embodiment, the secondary manual actuator has a vent position where the second volume of air is delivered to the turbo pump and a decoupled position where the second volume of air is prevented from being delivered to the turbo pump. Accordingly, a second or further manual actuator may be provided which may deliver the second volume of air to the turbo pump.

In one embodiment, the secondary manual actuator is manually configurable between the vent position and the decoupled position.

In one embodiment, the turbo pump vent assembly comprises a coupling operable to be received by a complementary coupling of the turbo pump and the secondary manual actuator is operable to disengage the coupling from the complementary coupling in the decoupled position to deliver the second volume of air to the turbo pump. Hence, the secondary manual actuator may comprise the coupling between the turbo pump vent and the turbo pump vent.

According to a second aspect, there is provided a turbo pump vent method, comprising: delivering an initial volume of air to slow a turbo pump using a primary manual actuator; and delivering a secondary flow of volume to slow the turbo pump using a secondary manual actuator, wherein the secondary volume of air is greater than the initial volume of air.

In one embodiment, the initial volume of air is less than the secondary volume of air.

In one embodiment, the method comprises manually actuating the primary manual actuator from a decoupled position where the initial volume of air is prevented from being delivered to the turbo pump to a vent position to deliver the initial volume of air.

In one embodiment, the method comprises manually actuating the primary manual actuator between the vent position and the decoupled position.

In one embodiment, the method comprises biasing the primary manual actuator to the decoupled position.

In one embodiment, the method comprises manually actuating the primary manual actuator to the vent position.

In one embodiment, the method comprises fluidly coupling a source of air with the turbo pump when in the vent position and fluidly decoupling the source of air with the turbo pump when in the decoupled position using a valve.

In one embodiment, the method comprises manually fluidly coupling, against a bias, a source of air with the turbo pump when in the vent position and fluidly decoupling, with the bias, the source of air with the turbo pump when in the decoupled position.

In one embodiment, the method comprises restricting flow through the primary manual actuator when in the vent position.

In one embodiment, the method comprises retaining a stored volume of air in a reservoir when in the decoupled position and delivering the stored volume of air as the first volume of air to the turbo pump when in the vent position.

In one embodiment, the method comprises fluidly coupling the reservoir with an external source of the air to fill the reservoir when in the decoupled position.

In one embodiment, the method comprises fluidly decoupling the reservoir from the turbo pump when in the decoupled position.

In one embodiment, the method comprises fluidly coupling the reservoir with the turbo pump to deliver the stored volume of air as the first volume of air to the turbo pump when in the vent position.

In one embodiment, the method comprises fluidly decoupling the reservoir from the external source of the air when in the vent position.

In one embodiment, the method comprises manually displacing the reservoir between the decoupled position and the vent position.

In one embodiment, the method comprises displacing the reservoir one of linearly and rotationally.

In one embodiment, the method comprises providing a plurality of the reservoirs.

In one embodiment, the method comprises delivering the first volume to the turbo pump from each reservoir when in an associated vent position.

In one embodiment, the method comprises actuating the secondary manual actuator to a vent position to deliver the second volume to the turbo pump.

In one embodiment, the method comprises actuating the secondary manual actuator to a decoupled position to prevent the second volume from being delivered to the turbo pump.

In one embodiment, the method comprises manually configuring the secondary manual actuator between the vent position and the decoupled position.

In one embodiment, the method comprises disengaging a coupling of the turbo pump vent assembly from a complementary coupling of the turbo pump to deliver the second volume of air to the turbo pump.

According to a third aspect, there is provided a turbo pump vent assembly or method as hereinbefore described with reference to the accompanying drawings.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Figure 1:
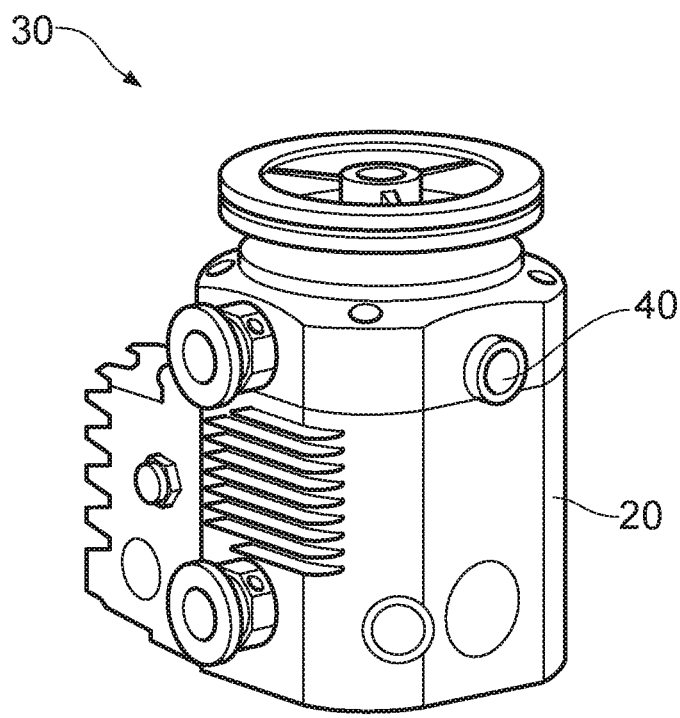
FIG. 1 illustrates a vent assembly according to one embodiment.
Figure 1:
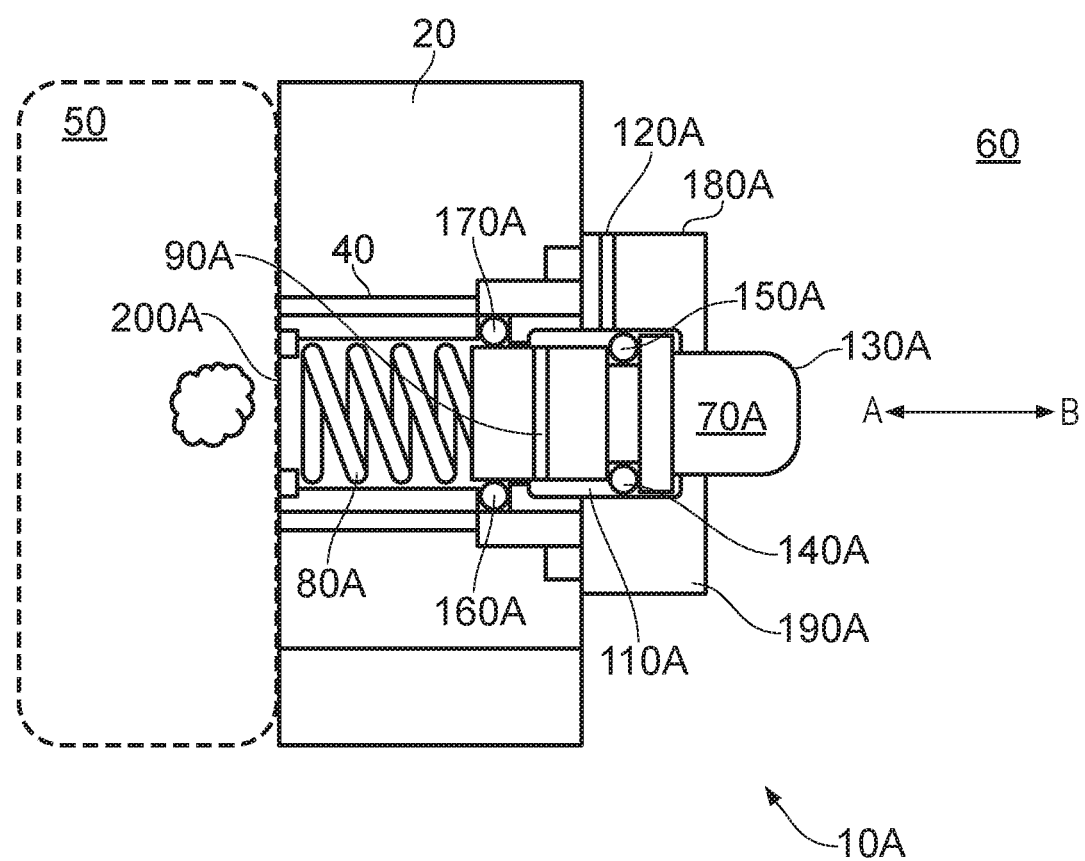

Before discussing the embodiments in any more detail, first an overview will be provided. One limiting factor in the ability to rapidly switch between processing stages in processing equipment, such as semiconductor fabrication equipment, is the ability to create and release a vacuum within that processing equipment. In particular, when a turbo pump is utilised in the creation of a vacuum, the speed at which the turbo pump can be slowed is a limiting factor given the rotational speed, momentum and low losses of such turbo pumps which result in them continuing to rotate for long periods of time even after being deactivated.

Embodiments recognise that a simple mechanism for slowing a turbo pump is the introduction of a gas stream into the turbo pump chamber. The frictional effect of the gas stream being introduced into the turbo pump chamber helps the speed reduction of the turbo pump rotor. However, the introduction of the gas into the turbo pump causes stresses on the rotor and the bearings supporting the rotor. Accordingly, the amount or quantity of gas that can be introduced varies depending on the speed of the rotor. In particular, the amount of gas that is introduced initially needs to be carefully controlled in order to avoid damage to the turbo pump. However, continuing to deliver that initial flow of gas results in the deceleration of the rotor taking longer than is necessary, since a greater volume of gas can be introduced once the rotor speed has slowed sufficiently for it to be safe to do so. Although electro-mechanical arrangements exist which can be used to slow the turbo pump rapidly, these are complex and are comprised of many components.

Accordingly, embodiments provide a simple mechanical arrangement to rapidly slow a turbo pump. Embodiments provide a turbo pump vent assembly which may be retrofitted to existing turbo pumps. The turbo pump vent assembly is a manually-actuated mechanical arrangement which has a primary, initial or first actuator or device which, when employed, delivers one or more initial flows, volumes or bursts of air which initially slows the turbo pump. The vent assembly also comprises another, a second or a further manually-operated actuator or device which, when employed, delivers a second flow or volume of air to the turbo pump. The amount of air provided by the secondary manual actuator is greater than the amount of air provided by the primary manual actuator. Hence, by simple user operation, the turbo pump can be initially slowed using the primary actuator and then completely stopped by the user operating the secondary actuator. This provides a simple, reliable and effective mechanism for quickly halting the turbo pump. Typically, the primary manual actuator delivers controlled, fixed-volume amounts of the gas to slow the turbo pump incrementally. Typically, the secondary actuator provides a restricted continuous flow of gas to the turbo pump assembly to slow the rotor to a complete halt.

Vent Assembly—First Embodiment

FIG. 1 shows a vent assembly, generally 10A, according to one embodiment. The vent assembly is typically retrofitted into a conduit 40 formed in the housing 20 of the turbo pump 30. The conduit 40 extends from the vacuum side 50 internal to the turbo pump 30 and within which the rotor, bearings and associated structures are provided to the ambient side 60 which is at atmospheric pressure. A primary manual actuator 70A is provided. The primary manual actuator comprises a piston arrangement which is biased to the decoupled position shown in FIG. 1 by a spring 80A.

When in the position shown in FIG. 1, a volume 90A defined within the piston arrangement is in fluid communication with air on the ambient side 60 via the gallery 110A and the inlet 120A. In this position, air can flow into the volume 90A. When force is applied, typically by a user, to the end 130A of the piston arrangement, the force overcomes the bias of the spring 80A and the piston arrangement translates longitudinally in the direction A to a vent position (not shown). As the piston arrangement moves in the direction A, an O-ring seal 140A which is retained within a groove 150A on the surface of the piston arrangement moves in the direction A within the gallery 100A and fluidly decouples the volume 90A from the inlet 120A. Continued depression of the piston arrangement in the direction A causes the volume 90A to move past an O-ring seal 160A retained in a groove 170A provided on an inner surface of the vent assembly. Once the trapped volume 90A passes the O-ring seal 160A and in the vent position, it is then in fluid communication with the vacuum side 50 and the air stored within the trapped volume 90A is delivered to the vacuum side 50, via a restrictor aperture 200A which restricts the flow of the stored volume of air into the vacuum side 50, to slow the rotor of the turbo pump 30.

When the user ceases to apply pressure to the end 130A, the piston arrangement is displaced by the action of the spring 80A in the direction B and returns to the position shown in FIG. 1, where the trapped volume 90A is replenished with air.

Each press of the end 130A causes a fixed volume of air to be delivered to the vacuum side 50 of the turbo pump 30. Delivery of these fixed volumes of air causes sequential slowing of the rotor within the turbo pump 30.

A housing 190A which retains the piston arrangement is provided as a secondary manual actuator. An outer surface 180A of the housing 190A is knurled or ridged to facilitate gripping, and rotation of the housing 190A which enables the housing 190A to be either partially or completely removed. This fluidly couples the restrictor aperture 200 with the ambient side 60 to enable a second flow of air to enter the vacuum side 50 which in turn halts the rotor within the turbo pump 30. When it is desired to restart the turbo pump, the housing 190 is refitted to fluidly decouple the restrictor aperture 200A from the ambient side 60.

Vent Assembly—Second Embodiment

Figure 2:
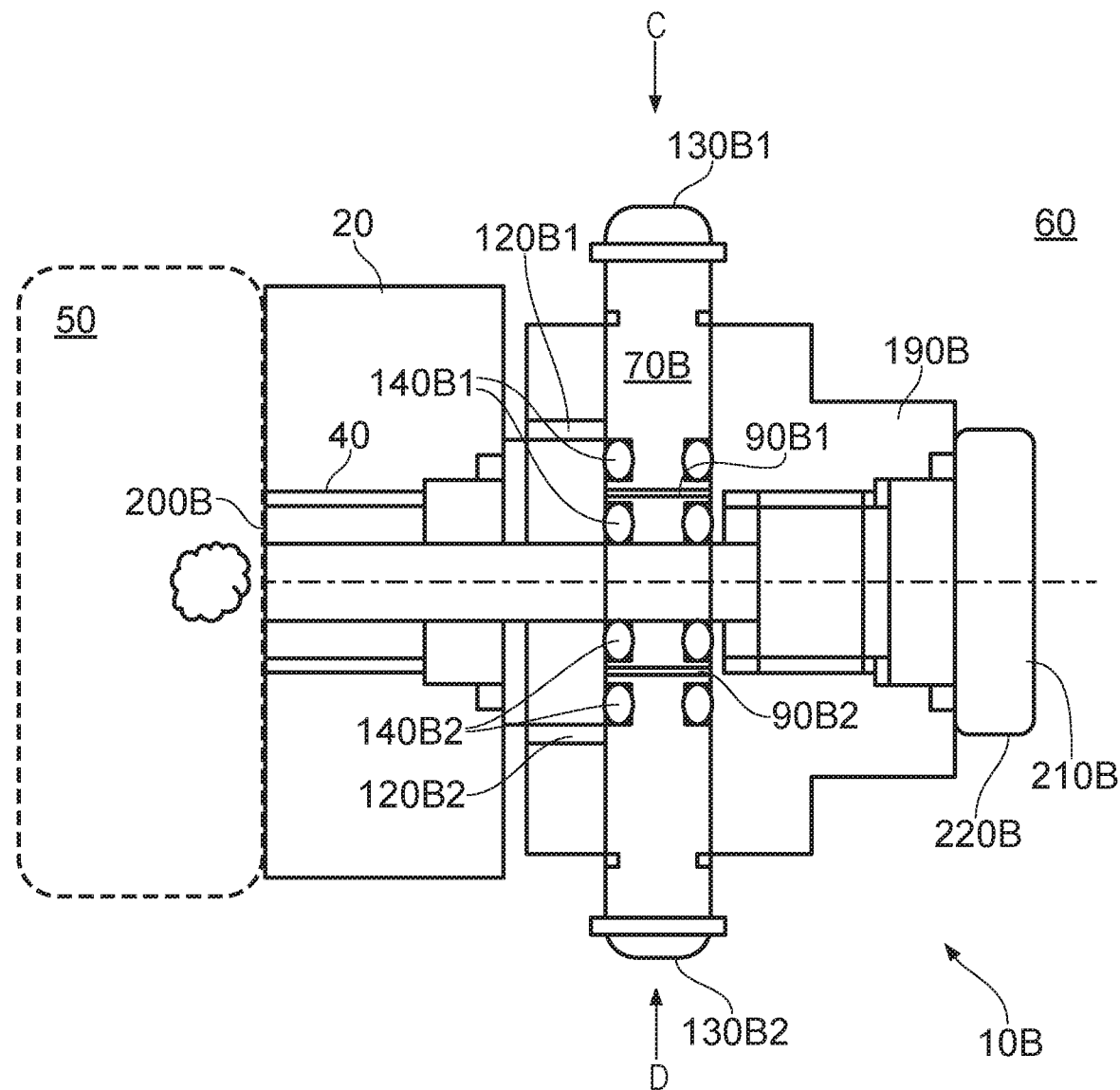
FIG. 2 illustrates a vent assembly according to one embodiment.

FIG. 2 illustrates a vent assembly 10B according to one embodiment. The vent assembly 10B is typically retro-fitted into the conduit 40 formed in the housing 20 of the turbo pump 30. The conduit 40 extends from the vacuum side 50 internal to the turbo pump 30 and within which the rotor, bearings and associated structures are provided to the ambient side 60 which is at atmospheric pressure. A restrictor aperture 200B restricts the rate of flow of any air provided by the vent assembly 10B to the vacuum side 50. The vent assembly 10B is similar to the embodiment mentioned above, but uses a double-throw piston arrangement as the primary manual actuator 70B, having a pair of trapped volumes 90B1, 90B2 extending therethrough.

Ends 130B1 103B2 are alternately pressed by the user. Pressing on one of the ends 130B1 causes a displacement in the direction C which causes the air retained within the trapped volume 90B1 to be in fluid communication with the vacuum side for delivery thereto via a restrictor aperture 200B. When in this position, the trapped volume 90B2 is in fluid communication via the inlet 120B2 which is filled with air. The air within the trapped volume 90B2 is retained by a pair of O-ring seals 140B2. Pressing on the end 130B2 causes displacement of the piston arrangement in the direction D and causes the trapped volume 90B2 to be in fluid communication with the vacuum side 50 for delivery of the air within the trapped volume 90B2 thereto via the restrictor aperture 200B. When in that position, the trapped volume 90B1 is in fluid communication with the ambient side 60 via the inlet 120B1 and refills with air. The air within the trapped volume 90B1 is retained by a pair of O-ring seals 140B1.

Continued alternate pressing on the ends 130B1 and 130B2 causes fixed volumes of air to be delivered to the vacuum side 50 via the restrictor aperture 200B to initially slow the rotor of the turbo pump 30.

A plug 210B is provided as a secondary manual actuator and has a knurled or ridged surface 220B to facilitate rotation for partial or complete removal of the plug 210B from the housing 190B. As the plug 210B is removed, the ambient side 60 becomes fluidly connected with the vacuum side 50 via the restrictor aperture 200B and air is delivered via the restrictor aperture 200B to the vacuum side 50 to slow and halt the rotor within the turbo pump 30. The plug 210B may then be refitted to fluidly decouple the vacuum side 50 from the ambient side 60 prior to restarting the turbo pump 30.

Vent Assembly—Third Embodiment

Figure 3:
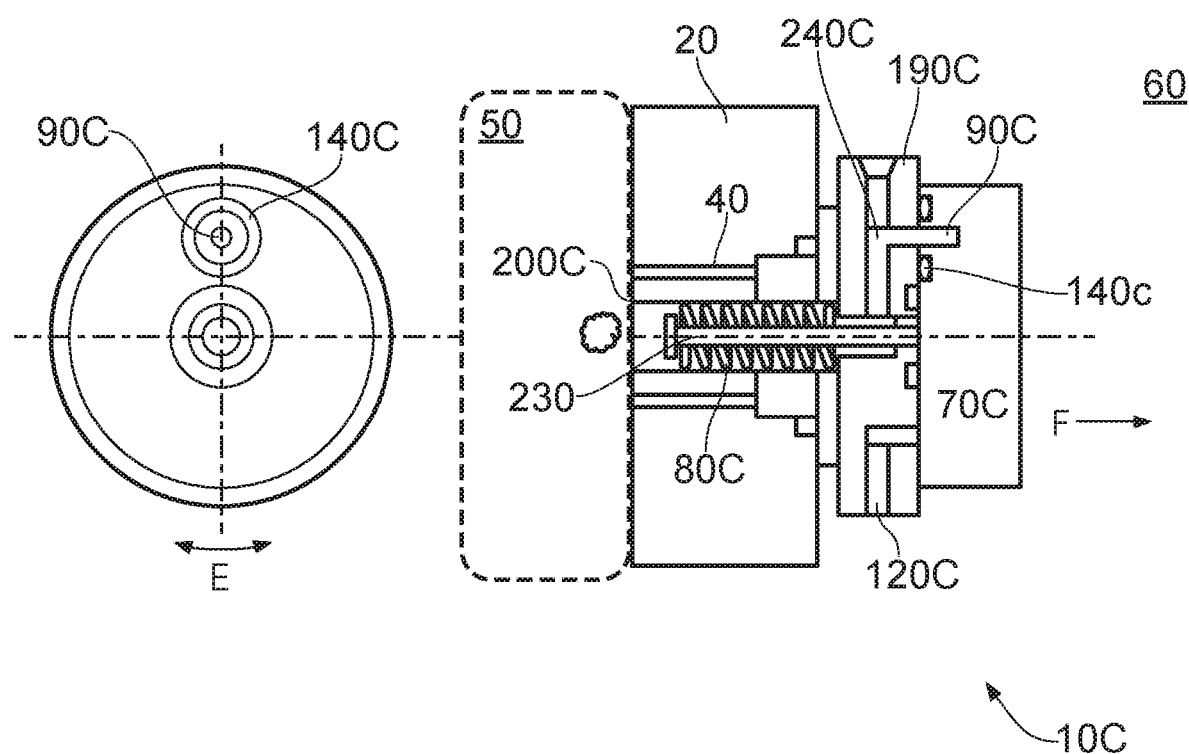
FIG. 3 illustrates a vent assembly according to one embodiment.

FIG. 3 illustrates a vent assembly 10C according to one embodiment. The vent assembly 10C is typically retro-fitted into the conduit 40 formed in the housing 20 of the turbo pump 30. The conduit 40 extends from the vacuum side 50 internal to the turbo pump 30 and within which the rotor, bearings and associated structures are provided to the ambient side 60 which is at atmospheric pressure. A restrictor aperture 200C restricts the rate of flow of any air provided by the vent assembly 10C to the vacuum side 50. The vent assembly 10C is similar to the embodiment mentioned above, but uses a rotating member as the primary manual actuator 70C, having one of more trapped volumes 90C therein.

In this arrangement, primary manual actuator 70C is retained by a housing 190C using a shaft 230C concentrically-surrounded by a retaining spring 80C. The primary manual actuator 70C is free to rotate about the housing 190C in the directions E.

When in the position illustrated in FIG. 3, a trapped volume 90C within the body 130C is fluidly coupled via a conduit 240C with the vacuum side 50 for delivery of the air within the trapped volume 90 to the vacuum side to initially slow the rotor of the turbo pump 30.

Continued rotation of the primary manual actuator 70C decouples the trapped volume 90C from the conduit 240C. Continued rotation aligns the trapped volume 90C with an inlet 120C to fluidly couple the trapped volume 90C with the ambient side 60 so that air refills the trapped volume 90C. An O-ring seal 140C retain the air within the trapped volume 90C.

Continued rotation of the member 130C causes the trapped volume 90C to become fluidly recoupled with the conduit 240C to deliver a further volume of air via the restrictor 200C to the vacuum side 50 to further slow the rotor of the turbo pump 30.

The primary manual actuator 70C has a dual use and also provides the function of a secondary manual actuator. Once the speed of the rotor of the turbo pump 30 has slowed sufficiently, the primary manual actuator 70C may be gripped and pulled in the direction F, against the bias of the spring 80C. This fluidly couples the vacuum side 50 via the restrictor 200C with ambient side 60 and allows air to enter the vacuum side 50 from the ambient side 60 to further slow and halt the rotor of the turbo pump 30.

Although in this embodiment just one trapped volume 90C is illustrated, it will be appreciated that a plurality of such trapped volumes may be provided so that trapped volumes may be replenished and delivered in less than a complete turn of the primary manual actuator 70C.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A turbo pump vent assembly, comprising:
   a primary manual actuator operable to deliver an initial volume of air to a turbo pump, wherein said primary manual actuator has a vent position where said initial volume of air is delivered to said turbo pump and a decoupled position where said initial volume of air is prevented from being delivered to said turbo pump and wherein a source of said initial volume of air comprises a reservoir operable to receive air when in said decoupled position, to become sealed during a transition from said decoupled position to said vent position to form a stored volume of air and to deliver an amount of air limited to said stored volume of air as said initial volume of air to said turbo pump when in said vent position; and a secondary manual actuator operable to deliver a secondary volume of air to said turbo pump, wherein said secondary volume of air is greater than said initial volume of air.

2. The turbo pump vent assembly of claim 1, wherein said primary manual actuator is manually configurable between said vent position and said decoupled position.

3. The turbo pump vent assembly of claim 1, wherein said primary manual actuator is biased towards said decoupled position.

4. The turbo pump vent assembly of claim 1, wherein said primary manual actuator is releaseably configurable to said vent position.

5. The turbo pump vent assembly of claim 1, wherein said valve arrangement is manually operable to fluidly couple said source of said initial volume of air with said turbo pump when in said vent position and biased to fluidly decouple said source of said initial volume of air with said turbo pump when in said decoupled position.

6. The turbo pump vent assembly of claim 1, wherein said primary manual actuator has a conduit fluidly coupling said source of said initial volume of air with said turbo pump, said conduit having a restrictor configured to restrict flow through said conduit when in said vent position.

7. The turbo pump vent assembly of claim 1, wherein said primary manual actuator comprises a valve arrangement operable to fluidly couple said reservoir with an external source of said air to fill said reservoir when in said decoupled position.

8. The turbo pump vent assembly of claim 7, wherein said valve arrangement is operable to fluidly decouple said reservoir from said turbo pump when in said decoupled position.

9. The turbo pump vent assembly of claim 7, wherein said valve arrangement is operable to fluidly decouple said reservoir from said external source of said air when in said vent position.

10. The turbo pump vent assembly of claim 7, wherein said reservoir is displaceable between said decoupled position and said vent position.

11. The turbo pump vent assembly of claim 7, wherein said reservoir is displaceable one of linearly and rotationally.

12. The turbo pump vent assembly of claim 1, wherein said secondary manual actuator has a vent position where said second volume of air is delivered to said turbo pump and a decoupled position where said second volume of air is prevented from being delivered to said turbo pump.

13. The turbo pump vent assembly of claim 12, wherein said secondary manual actuator is manually configurable between said vent position and said decoupled position.

14. The turbo pump vent assembly of claim 1, wherein said turbo pump vent assembly comprises a coupling operable to be received by a complementary coupling of said turbo pump and said secondary manual actuator is operable to disengage said coupling from said complementary coupling to deliver said second volume of air to said turbo pump.

15. A turbo pump vent method, comprising:
delivering an initial volume of air to a turbo pump using a primary manual actuator wherein said primary manual actuator has a vent position where said initial volume of air is delivered to said turbo pump and a decoupled position where said initial volume of air is prevented from being delivered to said turbo pump and wherein a source of said initial volume of air comprises a reservoir operable to receive air when in said decoupled position, to become sealed during a transition from said decoupled position to said vent position to form a stored volume of air and to deliver an amount of air limited to said stored volume of air as said initial volume of air to said turbo pump when in said vent position; and delivering a secondary flow of volume to said turbo pump using a secondary manual actuator, wherein said secondary volume of air is greater than said initial volume of air.

* * * * *